United States Patent
Oetlinger

(12) 
(10) Patent No.: US 7,562,855 B2
(45) Date of Patent: Jul. 21, 2009

(54) CLAMPING MECHANISM FOR FOLDER GLUER MACHINE

(75) Inventor: Frank E. Oetlinger, Grafton, WI (US)

(73) Assignee: Blanking Systems, Inc., Grafton, WI (US)

( * ) Notice: Subject to any disclaimer, the term of this patent is extended or adjusted under 35 U.S.C. 154(b) by 485 days.

(21) Appl. No.: 11/300,725

(22) Filed: Dec. 15, 2005

(65) Prior Publication Data

US 2006/0154797 A1 Jul. 13, 2006

Related U.S. Application Data

(60) Provisional application No. 60/636,217, filed on Dec. 15, 2004.

(51) Int. Cl.
*F16L 3/08* (2006.01)
(52) U.S. Cl. ............ 248/316.6; 248/227.4; 248/289.11; 600/234; 606/59; 403/391
(58) Field of Classification Search ............. 248/316.6, 248/55, 67.5, 67, 67.7, 68.1, 70, 74.4, 227.4, 248/316.1, 188.3, 288.11, 289.11; 600/234; 606/59; 403/389, 391
See application file for complete search history.

(56) References Cited

U.S. PATENT DOCUMENTS

| | | | | |
|---|---|---|---|---|
| 4,718,151 A | * | 1/1988 | LeVahn et al. ................. 24/535 |
| 5,025,780 A | * | 6/1991 | Farley ......................... 600/230 |
| 5,242,240 A | * | 9/1993 | Gorham ....................... 403/391 |
| 5,632,112 A | * | 5/1997 | Steinborn .................... 43/21.2 |
| 5,727,899 A | * | 3/1998 | Dobrovolny ................ 403/389 |
| 5,792,046 A | * | 8/1998 | Dobrovolny ................ 600/234 |
| 5,888,197 A | * | 3/1999 | Mulac et al. ................ 600/234 |
| 5,897,087 A | * | 4/1999 | Farley .................... 248/229.21 |
| 6,017,008 A | * | 1/2000 | Farley .................... 248/229.21 |
| 6,033,363 A | * | 3/2000 | Farley et al. ................ 600/234 |
| 6,123,482 A | * | 9/2000 | Keller ......................... 403/384 |
| D537,939 S | * | 3/2007 | Phillips et al. ............. D24/135 |
| 7,338,442 B2 | * | 3/2008 | Mulac et al. ................ 600/226 |
| 2002/0100852 A1 | * | 8/2002 | Eason et al. ........... 248/292.12 |

* cited by examiner

*Primary Examiner*—Anita M King
(74) *Attorney, Agent, or Firm*—Boyle Fredrickson, S.C.

(57) ABSTRACT

A clamping mechanism is provided for supporting a plurality of tools for use in a folder gluer machine. The clamping mechanism includes first and second clamps. Each clamp defines a corresponding clamping cavity for receiving a tool therein. Each clamp is movable between a release position wherein the clamping cavity has a first configuration and a clamping position wherein the clamping cavity has a second configuration. A clamping structure is operatively connected to the first and second clamps. The clamping structure sequentially moves the first and second clamps to their clamping positions.

16 Claims, 3 Drawing Sheets

CLAMPING MECHANISM FOR FOLDER GLUER MACHINE

CROSS-REFERENCE TO RELATED APPLICATION

This application claims the benefit of U.S. Provisional Application Ser. No. 60/636,217, filed Dec. 15, 2005.

FIELD OF THE INVENTION

This invention relates generally to folder gluer machines for making paper cartons from a traveling carton blank, and in particular, to a clamping mechanism for supporting various tools used by a folder gluer machine during a folding operation.

BACKGROUND AND SUMMARY THE INVENTION

As is known, a folder gluer machine is used for making paper cartons from a traveling carton blank. The carton blank is cut to an appropriate shape and scored in order to define a main carton portion and at least one flap. Thereafter, the carton blank is sent to a folder gluer machine for folding the flap to form a sidewall of the carton and to glue the sidewalls of the carton together. Typically, such paper cartons are employed in retail stores for boxing clothing or other similar items wherein a rigid carton is not required.

In order to form a paper carton from the carton blank, the folder gluer machine utilizes various tools. For example, a folding hook is typically employed to rotatably engage the bottom surface of the carton flap and to bend the flap along the score line so as to form the inside wall of the carton. The carton blank typically travels in a direction perpendicular to the score line so that the folding hook must be operated in timed relation to the speed of the carton blank. As such, it can be appreciated that the folding hook and the other tools associated with the folder gluer machine must be accurately positioned in order to properly fold the carton blank.

Heretofore, the tools used in the folder gluer machine were positioned by means of a clamping mechanism that would support multiple tools such as the folding hooks required to form the paper carton. However, these prior clamp mechanisms have certain disadvantages. For example, these clamping mechanisms do not provide for progressive tensioning of each clamp holding the tools. In other words, prior clamping mechanisms simultaneously clamp or release the multiple tools supported thereby. As a result, it is difficult to accurately position and clamp the tools for the folder gluer machine with the prior clamping mechanisms. In addition, the clamps utilized in these prior clamping mechanisms contact the tools at a minimum number of points such that the clamping pressure exerted by the clamps is insufficient to maintain the positions of the tools supported thereby. As such, it is highly desirable to provide a clamping mechanism for a folder gluer machine that provides increased clamping pressure over prior clamping mechanisms.

Therefore, it is a primary object and feature of the present invention to provide a clamping mechanism for clamping multiple tools used by a folder gluer machine during operation.

It is a still further object and feature of the present invention to provide a clamping mechanism for clamping multiple tools used by a folder gluer machine that incorporates progressive clamping of such tools.

It is a still further object and feature of the present invention to provide a clamping mechanism for clamping multiple tools used by a folder gluer machine that is inexpensive to manufacture and simple to operate.

In accordance with the present invention, a clamping mechanism is provided for supporting a plurality of tools for use in a folder gluer machine. The clamping mechanism includes a first clamp defining a first clamping cavity for receiving a first tool therein. The first clamp is movable between a release position wherein the first clamping cavity has a first configuration and a clamping position wherein the first clamping cavity has a second configuration. A second clamp defines a second clamping cavity for receiving a second tool therein. The second clamp is movable between a release position wherein the second clamping cavity has a first configuration and a clamping position wherein the second clamping cavity has a second configuration. A clamping structure is operatively connected to the first and second clamps. The clamping structure sequentially moves the first and second clamps to the clamping positions.

The first clamp includes a plurality of contract surfaces for engaging the first tool when the first clamp is in the clamping position. The first clamp may also include upper and lower clamping elements. The upper clamping element has an inner surface. The inner surface includes an arcuate surface portion partially defining the first clamping cavity. The lower clamping element also has an inner surface. The inner surface of the lower clamping element includes an arcuate surface portion partially defining the first clamping cavity. The first clamp includes a biasing element for urging the upper clamping element away from the lower clamping element such that the first clamping cavity is in the second configuration.

The second clamp also includes upper and lower clamping elements. The upper clamping element has an inner surface. The inner surface includes an arcuate surface portion partially defining the second clamping cavity. The lower clamping element also has an inner surface. The inner surface of the lower clamping element includes an arcuate surface portion partially defining the second clamping cavity.

The clamping mechanism may include at least one contact pad projecting from the arcuate surface portion of the inner surface of upper clamping element and extending into the first clamping cavity. The clamping structure includes an elongated member extending along an axis through the first and second clamps. The first and second clamps are pivotable about the axis of the elongated member with at least one of the first clamp and the second clamp in the release position. A friction disc may be positioned between the first and second clamps.

In accordance with a further aspect of the present invention, a clamping mechanism is provided for supporting a plurality of tools for use in a folder gluer machine. The clamping mechanism includes first and second clamps. Each clamp has upper and lower clamping elements. Each upper clamping element has an inner surface that includes an arcuate surface portion partially defining a corresponding clamping cavity. Each lower clamping element has an inner surface that includes an arcuate surface portion partially defining a corresponding clamping cavity. An elongated member extends along an axis through the first and second clamps. A clamping structure is movable between a release position wherein the first and second clamps are rotatable about the axis and a clamping position wherein the first and second clamps are maintained at user desired positions about the axis.

The upper clamping element and the lower clamping element of each clamp are movable between a release position wherein the corresponding clamping cavity has a first configuration and a clamping position wherein the corresponding clamping cavity has a second configuration. Each clamp may also include a biasing element for urging the corresponding clamping cavity toward the second configuration. The clamping structure progressively moves the upper clamping element and the lower clamping element of the first clamp between the release position and the clamping position and the upper clamping element and the lower clamping element of the second clamp between the release position and the clamping in response to the clamping structure moving from the release position to the clamping position.

A friction disc may be positioned between the first and second clamps. The friction disc prevents rotation of the first and second clamps with the clamping structure in the clamping position. The first clamp includes at least one contact pad projecting into the first clamping cavity. Similarly, the second clamp includes at least one contact pad projecting into the second clamping cavity. The first clamp also includes first and second connection hooks for interconnecting the upper clamping element and the lower clamping element of the first clamp. Likewise, the second clamp includes first and second connection hooks for interconnecting the upper clamping element and the lower clamping element of the second clamp.

In accordance with a still further aspect of the present invention, a method of clamping a plurality of tools for a folder gluer machine is provided. The method includes the step of providing a clamping mechanism having first and second clamps. Each clamp has a release position and a clamping position. The first and second clamps are sequentially moved to the clamping positions.

The first and second clamps are positioned in user desired positions, and thereafter, clamped in such positions. Each clamp has a corresponding clamping cavity. The method may include the additional step of inserting tools in corresponding clamping cavities. The tools may then be restrained in corresponding clamping cavities in multiple planes with the clamps in the clamping positions. Each clamp has a corresponding clamping cavity. Each clamping cavity having a first configuration with a corresponding clamp in the release position and a second configuration with the corresponding clamp in the clamping position. The clamping cavities are urged toward the first configurations.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DETAILED DESCRIPTION OF THE PREFERRED EMBODIMENT

Figure 1:
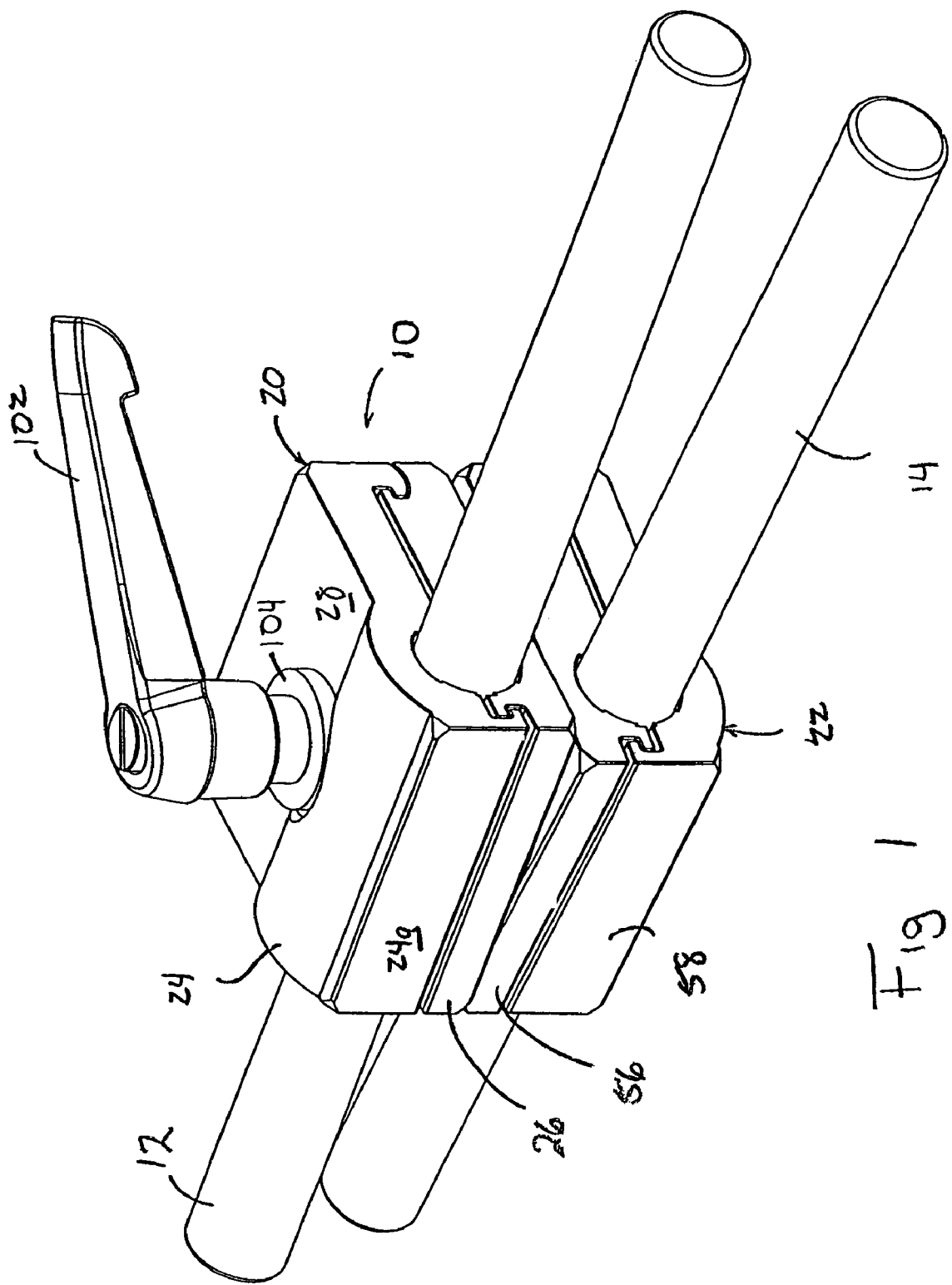
FIG. 1 is an isometric view of the clamping mechanism of the present invention.

Referring to FIG. 1, a clamping mechanism in accordance with the present invention is generally designated by the reference numeral 10. Clamping mechanism 10 is intended to support first and second tools 12 and 14, respectively, for use in a folder gluer machine. As is conventional, each tool 12 and 14 extends along a corresponding axis 16 and 18, respectively. By way of example, tools 12 and 14 may take the form of folding guides, finger hooks, plows, swords and/or glue applicators. However, other tools may be supported by clamping mechanism 10 without deviating from the scope of the present invention.

Figure 2:
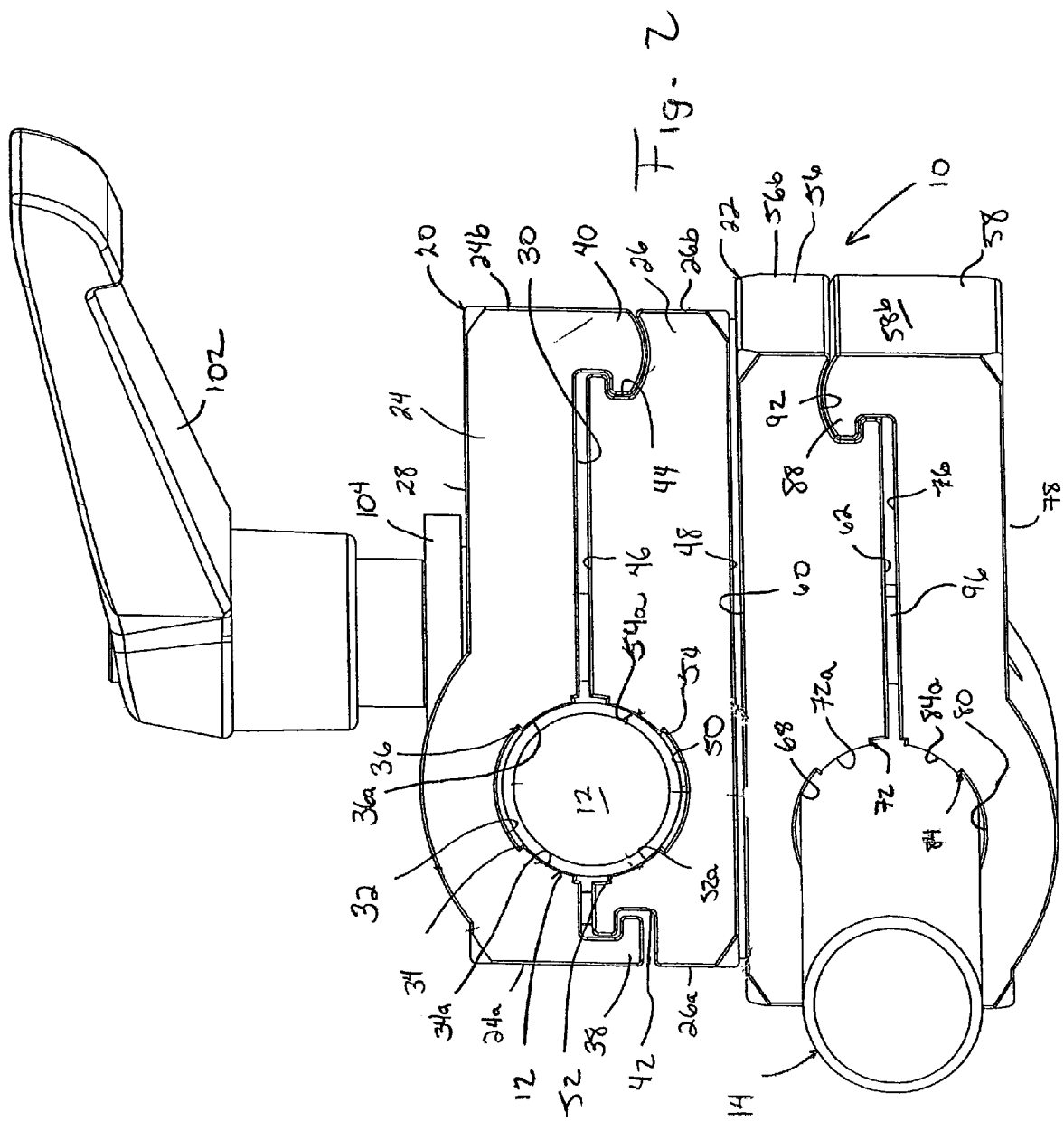
FIG. 2 is a side elevational view of the clamping mechanism of FIG. 1.
Figure 3:
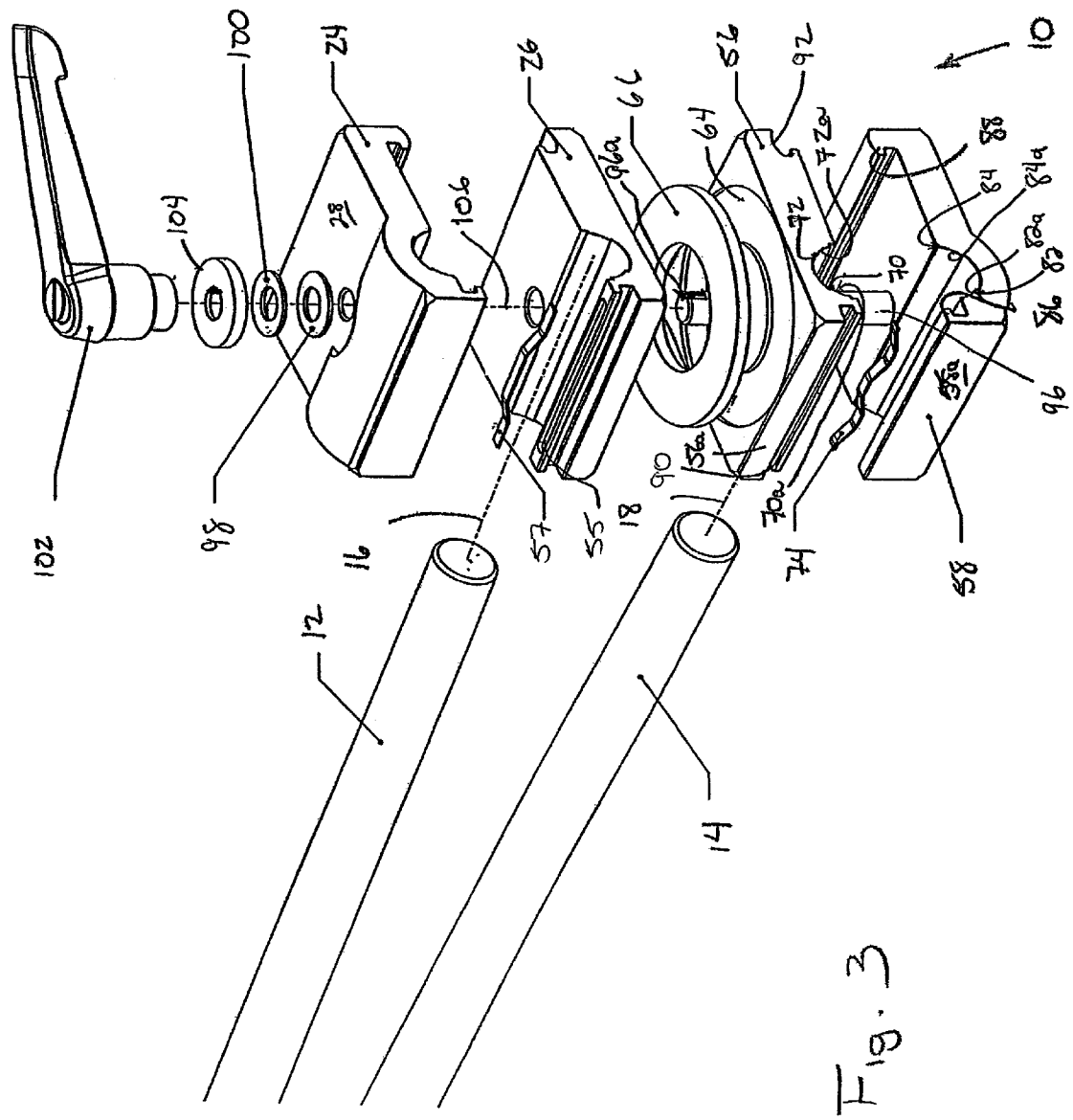
FIG. 3 is an exploded, isometric view of the clamping mechanism of the present invention.

Referring to FIG. 2, clamping mechanism 10 includes upper clamp 20 and lower clamp 22. Upper clamp 20 includes an upper clamping element 24 and a lower clamping element 26 for receiving tool 12 therebetween. Upper clamping element 24 of upper clamp 20 includes outer surface 28 and inner surface 30. Inner surface 30 has an arcuate surface portion 32 therein that partially defines a clamping cavity within upper clamp 20. Contact pads 34 and 36 project from arcuate surface portion 32 and terminate at corresponding contact areas 34a and 36a, respectively. Upper clamping element 24 further includes connection hooks 38 and 40 depending from opposite sides 24a and 24b of upper clamp element 24 of upper clamp 20. Connection hooks 38 and 40 are adapted for receipt in corresponding recesses 42 and 44 in sides 26a and 26b, respectively, of lower clamping element 26 of upper clamp 20. As hereinafter described, recess 42 in side 26a of lower clamping element 26 allows for limited vertical movement of connection hook 38 of upper clamping element 24 such that tool 12 may be inserted into or removed from the clamping cavity within upper clamp 20.

Lower clamping element 26 of upper clamp 20 includes inner surface 46 and outer surface 48. Inner surface 46 includes arcuate surface portion 50 that partially defines the clamping cavity within upper clamp 20. Contact pads 52 and 54 projects from arcuate surface portion 50 and terminate at corresponding contact areas 52a and 54a, respectively. Lower clamping element 26 further includes spring recess 55 for receiving spring 57 therein. Spring 57 engages and urges upper clamping element 24 of upper clamp 20 away from lower clamping element 26 of upper clamp 20 to allow tool 12 to be inserted into and removed from the clamping cavity within upper clamp 20.

Lower clamp 22 includes upper clamping element 56 and lower clamping element 58 for receiving tool 14 therebetween. Upper clamping element 56 of lower clamp 22 includes upper surface 60 and inner surface 62. Upper surface 60 of upper clamping element 56 of lower clamp 22 includes recess 64 therein for receiving friction disk 66. It is intended that friction disk 66 maintain the alignment of upper clamp 20 and lower clamp 22 with respect to one another, as hereinafter described. Inner surface 62 includes an arcuate surface portion 68 that partially defines the clamping cavity within lower clamp 22. Contact pads 70 and 72 project from arcuate surface portion 68 and terminate at corresponding contact areas 70a and 72a, respectively. Upper clamping element 56 of lower clamp 22 further includes a spring recess (not shown) in inner surface 62 for receiving spring 74 therein. Spring 74 engages and urges lower clamping element 58 of lower clamp 22 away from upper clamping element 56 of lower clamp 22 to allow for tool 14 to be inserted into and removed from the clamping cavity within lower clamp 22.

Lower clamping element 58 of lower clamp 22 includes inner surface 76 and outer surface 78. Inner surface 76 includes an arcuate surface portion 80 that partially defines the clamping cavity within lower clamp 22. Contact pads 82 and 84 project from arcuate surface 80 and terminate at corresponding contact areas 82a and 84a, respectively. Lower clamping element of lower clamp 22 further includes connection hooks 86 and 88 projecting from opposite sides 58a and 58b of lower clamp element 58 of lower clamp 22. Connection hooks 86 and 88 are adapted for receipt in corresponding recesses 90 and 92 in sides 56a and 56b of upper clamping element 56 of lower clamp 22. Recess 90 in side 56a of upper clamping element 56 of lower clamp 22 allows for limited vertical movement of connection hook 86 of upper clamping element 58 to allow for tool 14 to be inserted into and removed from the clamping cavity within lower clamp 22.

Upper and lower clamps 20 and 22, respectively, are pivotably connected to each other by a bolt 96 projecting through upper and lower clamping elements 56 and 58, respectively, of lower clamp 22 and through upper and lower clamping elements 24 and 26, respectively, of upper clamp 20. Bellville springs 98 and 100 are positioned on terminal end 96a of bolts adjacent outer surface 28 of upper clamping element 24 of upper clamp 20. In addition, handle 102 is threaded onto terminal end 96a of bolt 96. It is contemplated to provide a washer 104 on terminal end 96a of bolt 96 between handle 102 and Bellville spring 100 so as to facilitate rotation of handle 102 about the axis 106 of bolt 96.

In operation, tools 12 and 14 may be inserted into corresponding clamping cavities within upper clamps 20 and 22, respectively. As heretofore described, spring 57 acts to separate upper and lower clamping elements 24 and 26, respectively, of upper clamp 20 so as to enlarge the clamping cavity therein and facilitate the insertion of tool 12 into such clamping cavity. Similarly, spring 74 acts to separate upper and lower clamping elements 56 and 58 of lower clamp 22 so as to allow for insertion of tool 14 into the clamping cavity defined by a lower clamp 22. As described, it is contemplated that upper and lower clamps 20 and 22, respectively, of clamping mechanism 10 be pivotable about axis 106 on bolt 96 so as to allow for further alignment of tools 12 and 14, respectively. Friction disk 66 provides stability during the positioning of upper and lower clamps 20 and 22, respectively, prior to exertion of a clamping force on tools 12 and 14, as hereinafter described.

As handle 102 is threaded further onto terminal end 96a of bolt 96, handle 102 exerts a pressure on Bellville springs 98 and 100, which, in turn, exert a clamping pressure on springs 57 and 74. It is contemplated that springs 57 and 74 have different spring tensions. As a result, as handle 102 is further tightened on terminal 96a of bolt 96, the clamping pressure exerted on tools 12 and 14 within corresponding clamping cavities in upper and lower clamps 20 and 22, respectively, is progressive such that one of the tools becomes fixed within its corresponding clamping cavity prior to the other tool becoming fixed within its corresponding clamping cavity. It can be appreciated that the progressive clamping of tools 12 and 14 within the corresponding clamping cavities in upper and lower clamps 20 and 22, respectively, facilitates the positioning of tools 12 and 14 within such clamping cavities.

As handle 102 is tightened on terminal 96a of bolt 96, contact areas 34a and 36a of contact pads 34 and 36, respectively, of upper clamping element 24 of upper clamp 20 and contact areas 52a and 54a of contact pads 52 and 54, respectively, of lower clamping element 26 of upper clamp 20 engage tool 12. In addition, contact areas 70a and 72a of contact pads 70 and 72, respectively, of upper clamping element 56 of lower clamp 22 and contact areas 82a and 84a of contact pads 82 and 84, respectively, of lower clamping element 58 of lower clamp 22 engage tool 14. Since tools 12 and 14 within corresponding clamping cavities and upper and lower clamps 20 and 22, respectively, are contacted in four distinct contact points within such clamps, each tool 12 and 14 is restrained in all planes. With handle 102 tightened, friction disc 66 discourages movement of upper and lower clamps 20 and 22, respectively, with respect to each other.

In order to release tools 12 and 14, handle 102 is threaded off bolt 96. As handle 102 is threaded off bolt 96, the clamping pressure exerted on tools 12 and 14 within corresponding clamping cavities in upper and lower clamps 20 and 22, respectively, is progressively reduced such that one of the tools releases from its corresponding clamping cavity prior to the other tool releasing from its corresponding clamping cavity.

Various modes of carrying out the invention are contemplated as being within the scope of the following claims particularly pointing and distinctly claiming the subject matter that is regarded as the invention.

I claim:

1. A clamping mechanism for supporting a plurality of tools for use in a folder gluer machine, comprising:
    a first clamp defining a first clamping cavity for receiving a first tool therein, the first clamp movable between a release position wherein the first clamping cavity has a first configuration and a clamping position wherein the first clamping cavity has a second configuration;
    a first biasing structure engageable with the first clamp, the first biasing structure urging the first clamp towards the release position with a first biasing force;
    a second clamp defining a second clamping cavity for receiving a second tool therein, the second clamp movable between a release position wherein the second clamping cavity has a first configuration and a clamping position wherein the second clamping cavity has a second configuration;
    a second biasing structure engageable with the second clamp, the second biasing structure urging the second clamp towards the release position with a second biasing force that differs from the first biasing force; and
    a clamping structure operatively connected to the first and second clamps, the clamping structure sequentially moving the first and second clamps to the clamping positions.

2. The clamping mechanism of claim 1 wherein the first clamp includes a plurality of contract surfaces for engaging the first tool when the first clamp is in the clamping position.

3. The clamping mechanism of claim 1 wherein the first clamp includes:
    an upper clamping element having an inner surface, the inner surface including an arcuate surface portion partially defining the first clamping cavity; and
    a lower clamping element having an inner surface, the inner surface of the lower clamping element including an arcuate surface portion partially defining the first clamping cavity.

4. The clamping mechanism of claim 3 wherein the first biasing structure urges the upper clamping element away from the lower clamping element such that the first clamping cavity is in the second configuration.

5. The clamping mechanism of claim 3 wherein the second clamp includes:
    an upper clamping element having an inner surface, the inner surface including an arcuate surface portion partially defining the second clamping cavity; and
    a lower clamping element having an inner surface, the inner surface of the lower clamping element including an arcuate surface portion partially defining the second clamping cavity.

6. The clamping mechanism of claim 3 further comprising at least one contact pad projecting from the arcuate surface portion of the inner surface of upper clamping element and extending into the first clamping cavity.

7. The clamping mechanism of claim 1 wherein the clamping structure includes an elongated member extending along an axis through the first and second clamps.

8. The clamping mechanism of claim 7 wherein the first and second clamps are pivotable about the axis of the elongated member with at least one of the first clamp and the second clamp in the release position.

9. The clamping mechanism of claim 7 further comprising a friction disc between the first and second clamps.

10. A clamping mechanism for supporting a plurality of tools for use in a folder gluer machine, comprising:
  a first clamp including:
    an upper clamping element having an inner surface, the inner surface including an arcuate surface portion partially defining a first clamping cavity;
    a lower clamping element having an inner surface, the inner surface of the lower clamping element including an arcuate surface portion partially defining the first clamping cavity; and
    a first biasing element positioned between the upper and lower clamping elements of the first clamp;
  a second clamp including:
    an upper clamping element having an inner surface, the inner surface including an arcuate surface portion partially defining a second clamping cavity;
    a lower clamping element having an inner surface, the inner surface of the lower clamping element including an arcuate surface portion partially defining the second clamping cavity; and
    a second biasing element positioned between the upper and lower clamping elements of the second clamp;
  an elongated member extending along an axis through the first and second clamps; and
  a clamping structure movable between a release position wherein the first and second clamps are rotatable about the axis and a clamping position wherein the first and second clamps are maintained at user desired positions about the axis;
  wherein:
    the upper clamping element and the lower clamping element of the first clamp are movable between a release position wherein the first clamping cavity has a first configuration and a clamping position wherein the first clamping cavity has a second configuration;
    the upper clamping element and the lower clamping element of the second clamp are movable between a release position wherein the second clamping cavity has a first configuration and a clamping position wherein the second clamping cavity has a second configuration;
    the first biasing element urges the upper and lower clamping elements of the first clamp towards the release position with a first biasing force; and
    the second biasing element urges the upper and lower clamping element of the second clamp towards the release position with a second biasing force, the second biasing force being greater than the first biasing force.

11. The clamping mechanism of claim 10 wherein the clamping structure progressively moves the upper clamping element and the lower clamping element of the first clamp between the release position and the clamping position and the upper clamping element and the lower clamping element of the second clamp between the release position and the clamping in response to the clamping structure moving from the release position to the clamping position.

12. The clamping mechanism of claim 10 further comprising a friction disc between the first and second clamps, the friction disc preventing rotation of the first and second clamps with the clamping structure in the clamping position.

13. The clamping mechanism of claim 10 wherein the first clamp includes at least one contact pad projecting into the first clamping cavity.

14. The clamping mechanism of claim 13 wherein the second clamp includes at least one contact pad projecting into the second clamping cavity.

15. The clamping mechanism of claim 10 wherein the first clamp includes first and second connection hooks for interconnecting the upper clamping element and the lower clamping element of the first clamp.

16. The clamping mechanism of claim 15 wherein the second clamp includes first and second connection hooks for interconnecting the upper clamping element and the lower clamping element of the second clamp.

* * * * *